United States Patent Office 2,781,335
Patented Feb. 12, 1957

2,781,335

AQUEOUS ACETIC ACID SOLUBLE POLYAMINES OF EPOXIDE COPOLYMERS

Martin E. Cupery, Wilmington, Del., assignor to E. I. du Pont de Nemours and Company, Wilmington, Del., a corporation of Delaware No Drawing. Application June 23, 1952,
Serial No. 295,127

19 Claims. (Cl. 260—85.7)

This invention relates to novel polyamine copolymers and to their preparation.

This application is a continuation-in-part of my copending application Serial No. 176,918, filed July 31, 1950, now abandoned.

Organic polymeric compounds containing reactive amine groups are of considerable importance in wool shrinkproofing, finishes for paper and fabrics and in other coating applications. However, polyamines hitherto available are deficient in certain characteristics, such as exhibiting poor color stability. Furthermore, polyprimary amines heretofore available are obtained by a process requiring catalytic reduction at elevated pressures. Such a process has the disadvantage that it requires a considerable investment in equipment.

It is an object of this invention to provide novel polyamine copolymers and a method for their preparation. A further object is to provide a new class of copolymers which contain basic amine groups and are soluble in dilute aqueous acid solutions. A further object is to provide a process for their preparation which avoids catalytic hydrogenation at high pressures. A still further object is to provide a new class of polyamine copolymers which have excellent resistance to discoloration on aging at room or elevated temperatures when used as impregnating or coating compositions. Another object is to provide polyamine copolymers which are highly useful as water-resistant films and coatings. Other objects will appear hereinafter.

The objects of this invention are accomplished by providing polyamine copolymers which are the reaction products of ammonia or a hydrogen-bearing monoamine with an epoxide copolymer, said epoxide copolymer having a molecular weight of at least 800 and at least one oxirane group attached laterally to the polymer chain with an epoxide oxygen content within the range of 0.4 to 7%. These polyamine copolymers are the reaction products of ammonia or a hydrogen-bearing monoamine with an epoxide copolymer of a monoethylenically unsaturated polymerizable epoxy monomer containing an oxirane unit and one or more polymerizable vinylidene epoxy-free monomers, each of which preferably contains one and only one vinylidene group, in a mole ratio within the range from 1 to 1 to 1 to 75 and preferably below 1 to 45 of the oxirane units to the vinylidene units, said epoxide copolymer having a molecular weight of at least 800. The mole ratio of the ethylenically unsaturated polymerizable epoxy monomer and polymerizable vinylidene epoxy-free monomer or monomers in the copolymer can be varied to the extent that there is at least one oxirane group attached laterally to the copolymer chain, and the oxirane (epoxide) oxygen content is within the range of 0.4 to 7%. The polyamine copolymers of this invention have an average neutral equivalent of not more than 6500 and generally of less than 3500 and preferably within the range of 160 to 3000. They have an amino nitrogen content of at least 0.3% and not over 10% and preferably at least 0.4% and not more than 7%.

A particularly preferred embodiment of this invention comprises the polyamines obtained from vinyl acetate/allyl glycidyl ether copolymers having a molar ratio of between 1/1 and 45/1 (corresponding to a weight ratio of between about 43/57 and 97/3) and generally less than 25/1 (corresponding to a weight ratio of 95/5) and reacted with an alkyl monoamine, and preferably isopropylamine, until 50–80% of the oxirane groups have been converted to beta-hydroxyamine groups.

In the reaction between ammonia or the hydrogen-bearing amine and the polyepoxy copolymer, it is believed that the oxirane group is converted to the corresponding polymeric derivative having hydroxyl and amino groups as illustrated below:

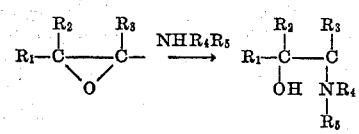

or

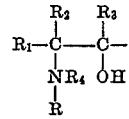

where $R_1$, $R_2$ and $R_3$ are hydrogen or organic groups such as lower alkyl of 1 to 6 carbon atoms, and $R_4$ and $R_5$ are hydrogen or lower aliphatic radicals, particularly the alkyl or alkanol groups of 1 to 4 carbons and the entire unit is attached laterally to the polymer chain. When the R groups in the above compositions are either hydrogen or simple aliphatic groups, or consist of both hydrogen and simple aliphatic groups, such as alkyl groups of 1 to 4 carbon atoms, the molecular weight of the polymer is within the range of about 800 to 15,000 or even higher and the neutral equivalent is below 600, the polyamine copolymers of the above structure have a high solubility in dilute aqueous acetic acid, that is aqueous acetic acid of 2 to 10% concentration, such as 3 or 5% aqueous acetic acid.

Polymerizable monomers having oxirane groups, such as allyl glycidyl ether and glycidyl methacrylate, are highly suitable for copolymerization with well known vinylidene monomers, including vinyl monomers. Among such classes of monomers are the ethylenically unsaturated polymerizable compounds having a terminal ethylenic double bond, the ethylenically unsaturated hydrocarbon compounds having a terminal ethylenic double bond, and polymerizable vinyl esters including esters of a monocarboxylic acid. Examples of such monomers are methacrylic and acrylic acid esters, styrene, butadiene, vinyl acetate, vinyl chloride, vinylidene chloride, chloroprene, vinyl ethers, and the like. Particularly preferred for reason of availability and reactivity of the resulting copolymer are the monomers containing up to 6 carbons and containing oxygen, preferably the polymerizable ethylenically unsaturated compounds containing ester groups, e. g., the vinyl alkanoates of monobasic acids having up to 4 carbons. The oxirane copolymers obtained in this way are reacted with ammonia, or hydrogen-bearing monoamines, such as monoalkyl and dialkylamines.

Ethylenically unsaturated, polymerizable, oxirane monomers particularly suitable for such copolymerizations are those which have the group

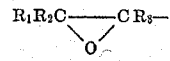

wherein $R_1$, $R_2$, $R_3$ are H or $CH_3$ attached through carbon and/or oxygen to a polymerizable vinylidene, including vinyl group, for example glycidyl acrylate, glycidyl methacrylate, glycidyl sorbate, glycidyl vinyl phthalate, glycidyl allyl phthalate, glycidyl allyl maleate, glycidyl allyl ether, glycidyl vinyl ether, 1,2-epoxybutene-3, allyl-alpha, beta-epoxyisovalerate, and the like. Particularly preferred are the compounds containing the glycidyl group

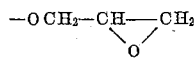

attached to carbon which in turn is attached to a two to three carbon monovalent radical containing a vinylidene group. Such include the allyl and methallyl ethers and the acrylic and methacrylic esters.

Ammonia and suitable hydrogen-bearing monoamines are reacted with the copolymers containing oxirane groups, as described above, to give the polyamine copolymers of this invention. The reaction may take place in absence of added solvent, in an inert solvent such as benzene or dioxane, or in the presence of water in view of the fact that water in the amounts of from 0.1 to 5% increases the reaction rate of the oxirane group with an amine. Suitable amines are represented by the formula $HNR_1R_2$ wherein $R_1$ and $R_2$ are hydrogen or aliphatic radicals of 1 to 8 carbons, including cycloaliphatic ring compounds. In general, the aliphatic radicals contain carbon and hydrogen or carbon, hydrogen and oxygen, and preferably are hydrocarbon or hydroxylated hydrocarbon. Examples of such amines are alkylamines such as methylamine, butylamine, cyclohexylamine, 2-ethylhexylamine, allyl amine, and benzyl amine. For optimum solubility of the copolymer, alkanolamines, such as ethanol and diethanolamines are employed. Lower alkyl amines, such as isopropylamine combine reactivity with solubility of the resulting polymer and the two to three carbon alkylamines are generally preferred.

The oxirane copolymer employed for the reaction with ammonia or the hydrogen-bearing monoamine compound contains a plurality of 1,2-epoxy units attached laterally by one or more intervening carbons and/or oxygen atoms to the polymer chain.

The molecular weights of the copolymers can be determined by any suitable manner, e. g., by ebullioscopic or viscosity measurements. The molecular weight of the oxirane copolymer should be at least 800 and preferably 1000 to 8000 although polymers having molecular weights of 15,000 or higher can be used providing the number of oxirane groups is high.

The oxirane oxygen content of the polymeric epoxides as well as the polymeric epoxyamines is determined by reaction of the epoxide in dry solution of dioxane or 2-ethoxyethanol with a standardized solution of hydrogen chloride in the solvent employed followed by a titration of the unreacted hydrogen chloride or chloride ion. In the initial epoxy containing copolymer employed for reaction with the amine, the oxirane oxygen content is within the range of 0.4 to 7%. Although it is possible to effect substantially complete reaction of the oxirane group with ammonia or a primary or secondary monoamine, the more useful polymers are those in which some of the oxirane groups are not reacted with the amino compound. These partially aminated compounds include those that have from 10–98% of the oxirane groups reacted with ammonia or an amine. Particularly preferred are the polyepoxides with from 50 to 80% of the oxirane groups reacted with a monoamine such as isopropyl amine. The presence of minor amounts (especially 20–50%) of residual oxirane groups in the polymer after reaction with amine is of particular utility in the preparation of superior coating compositions. Such products upon evaporation from solutions containing volatile acids produce coatings which have increased resistance to water.

The oxirane content can be controlled by regulation of the amounts of reactant, time, and temperature of the reaction with the amine. Copolymers which contain both epoxide and amine groups should be maintained at low temperatures or under neutral conditions to prevent precipitation or gel formation from aqueous solutions.

The neutral equivalent of the reaction product of the epoxy-containing copolymer and the monoamine is determined by titration in an alcohol solution with a strong acid. For a vinyl acetate/allyl glycidyl ether copolymer of 1/1 molar ratio (43/57 wt. ratio) after reaction with isopropyl amine, the neutral equivalent is about 260. For a polymeric amine derived from the polyepoxide from copolymerization of a 90/10 vinyl acetate/allyl glycidyl ether monomer mixture, the neutral equivalent is within the range of 1200–1350. The more soluble products have neutral equivalents that are between 260 and 1350 and preferably below 800. Copolymers having neutral equivalents of the order of 1200 form clear solutions of relatively high viscosities at solids contents of as high as 35–45% as their acetates or carbonates. High neutral equivalents usually are associated with higher viscosities or compositions of colloids in aqueous solutions. Useful compositions having neutral equivalents as high as 6500 can be obtained with hydrophilic polymers.

The solubility of the amine-reaction product of the epoxy-containing copolymer is also directly related to the proportion of hydrophilic groups present. In copolymers where the epoxy-containing monomer is polymerized with a hydrocarbon, the resulting copolymer is less soluble in aqueous acidic systems than when the comonomer contains hydrophilic groups as in vinyl acetate or methyl methacrylate.

The term "solution" as used herein with respect to solutions of the polyamine copolymers in dilute aqueous acetic acid has the usual meaning as stated in "General Chemistry for Colleges," pages 121–123, by Alexander Smith, The Century Co., New York, 1920 as follows: "A solution is a clear, transparent, perfectly homogeneous liquid, in which the dissolved substance seems to have been dispersed so completely that the liquid cannot be distinguished by the eye from a pure substance. . . . The qualitative characteristics, therefore, of solution are absence of settling, homogeneity, and extremely minute subdivision of the dissolved substance. . . . It must be stated explicitly that in going into solution, as we have used the term, a compound dissolves as a whole. . . ."

The following examples, in which the parts are by weight, illustrate the practice of this invention.

EXAMPLE I

*Allyl glycidyl ether/vinyl acetate copolymer+amines or ammonia*

To a solution of 30 parts allyl glycidyl ether and 70 parts vinyl acetate monomer in 100 parts benzene was added one part of alpha,alpha'-azodiisobutyronitrile catalyst, and the composition heated at 75° C., under nitrogen atmosphere, in a closed container for 8 hours. The unreacted monomers and benzene were removed by evaporation, with warming, under reduced pressure; the final traces being removed by lowering the pressure to about 1 mm. mercury pressure and heating to about 70° C. There remained 34 parts of soft, viscous polymer which was readily soluble in most organic solvents. Analysis indicated that the product comprised about 5 parts vinyl acetate copolymerized with 1 part allyl glycidyl ether. The product had a molecular weight of about 2,000 and an equivalent weight of 532 per oxirane oxygen.

Thirty-three parts of the above copolymer as a 22% polymer solution in benzene was treated with 5 parts diethanolamine and allowed to stand at room conditions for three days. The polymeric derivative was soluble in dilute aqueous acetic acid and was precipitated upon the addition of alkali or ammonia. Films obtained from solutions in dilute acetic acid were clear, glossy, moderately hard and gave no discoloration on heating at 100° C. for 30 minutes.

Similar treatments of the copolymer with monoethanolamine, or anhydrous ammonia under autogenous pressure, gave polymeric derivatives soluble in dilute acetic acid. Upon treatment with alkali, these solutions gave immediate precipitation of the amine polymer.

EXAMPLE II

*Allyl glycidyl ether/n-butyl acrylate copolymer + ethanolamine*

The following components, by weight, were loaded into a closed vessel, blanketed with nitrogen, and held under vigorous agitation and a constant temperature of 70° C. for 22 hours.

| | Parts |
|---|---|
| Allyl glycidyl ether | 480 |
| n-Butyl acrylate | 320 |
| Alpha,alpha'-azodiisobutyronitrile (polymerization catalyst) | 8 |
| Benzene | 710 |

The vessel was cooled to room temperature. The solvent and unreacted monomers were removed from the reaction mixture by distillation at 100° C./2 mm. pressure. To assure the complete removal of monomers, the product was then passed through a molecular still at 100–120° C. at $8 \times 10^{-3}$ mm. pressure. The yield of nonvolatile product was 408 parts of light yellow, viscous liquid.

This product was indicated to contain about 22% of allyl glycidyl ether as determined by analysis for oxirane oxygen. The copolymer had a molecular weight (ebullioscopic in benzene) of about 1900. It has an equivalent molecular weight of 550 per oxirane oxygen.

To eight parts of the above described copolymer of allyl glycidyl ether and n-butyl acrylate, dissolved in 20 parts dioxane, was added 2 parts monoethanolamine and the solution heated at 90° C. for three hours. On addition of water, the reaction product was precipitated. The resulting polymer was soluble in dilute aqueous acetic acid and was precipitated when the solution was neutralized with alkali or ammonium hydroxide. The initial copolymer, before reaction with ethanolamine was insoluble in water or dilute aqueous acetic acid. The polyamine had a neutral equivalent of 593.

EXAMPLE III

*Allyl glycidyl ether/vinyl chloride copolymer + ethanolamine*

The following constituents by weight were placed in a stainless steel bomb:

| | Parts |
|---|---|
| Vinyl chloride | 30 |
| Allyl glycidyl ether | 70 |
| Alpha,alpha' - azodiisobutyronitrile (polymerization catalyst) | 4 |
| Benzene | 45 |

The bomb was agitated for 16 hours at 80° C., then cooled and the reaction mixture removed. The solvent and unreacted monomers were removed by heating at 100° C./3 mm. pressure. The yield of residual polymer was 45 parts, which remained as a yellow, viscous liquid. Analysis for chlorine indicated a composition of 44% vinyl chloride and 56% allyl glycidyl ether. This corresponds to one oxirane oxygen per unit equivalent weight of 182.

To 45 parts of the above described copolymer of allyl glycidyl ether and vinyl chloride, in 200 parts dioxane, was added 30 parts of monoethanolamine and the solution heated for 2 hours at about 90° C. Upon addition of water to the composition, the reaction product was precipitated. It was soluble in dilute aqueous acetic acid and was precipitated from such solutions by treatment with alkaline reagents until the solutions were neutral or basic.

EXAMPLE IV

*Allyl glycidyl ether/vinyl chloride copolymer + ammonia*

Four parts of the copolymer of Example III, dissolved in about 20 parts dioxane, was treated in a closed vessel with anhydrous ammonia under about 20 lbs. pressure. After standing at about 25° C. for 70 hours, the product was precipitated by the addition of water. The product was soluble in dilute aqueous acetic acid and precipitated from such solution by the addition of excess alkali.

The product dissolved in dilute acetic acid solution was treated with 37% formaldehyde solution. There was no precipitate. Films obtained from evaporation of this dilute acid solution containing formaldehyde were insolubilized by heating at 100° C. for 30 minutes, whereas similar compositions without formaldehyde were still soluble in dilute acetic acid when heated under identical conditions. The formaldehyde-cured films were smooth, glossy, clear, hard, tough, and did not soften in water.

EXAMPLE V

*Glycidyl methacrylate/vinyl acetate copolymer+amines or ammonia*

A solution comprising 12 parts glycidyl methacrylate, 18 parts vinyl acetate, 70 parts anhydrous dioxane and 0.9 part benzoyl peroxide was placed in a closed container under nitrogen atmosphere and held at 80° C. for a total of four hours. During this time, substantially complete polymerization took place. The final solution had a viscosity of about 0.50 poises. The copolymer isolated from this solution had a mole ratio of glycidyl methacrylate to vinyl acetate of about 1:2.5 and contained about 4.7% by weight of oxirane oxygen. This corresponds to a unit equivalent weight of 395 per oxirane oxygen. The molecular weight was approximately 2000.

To a solution containing 10 parts of the above polymeric epoxide in 90 parts of dioxane was added 5 parts of monobutylamine and the solution heated at about 90–95° C. for about twenty minutes. The reaction product was precipitated upon the addition of water and was readily dissolved in the aqueous solution by the addition of acetic acid. Upon addition of excess alkali or ammonium hydroxide to the solution in dilute acid, the polymer was again immediately precipitated. Upon subsequent addition of excess acetic acid, it was again dissolved. Solutions in dilute acetic acid upon evaporation on glass plates deposited clear, smooth, glossy, tough films. The neutral equivalent of the above mentioned polymeric amine was 468.

In place of butylamine, other amines containing at least one hydrogen attached to the basic nitrogen were used, including mono- and diethanolamine, mono- and dimethylamine, mono- and diethylamine, cyclohexylamine, morpholine, and monoamylamine. The results were similar. Likewise, the above epoxide copolymer in dioxane solution was treated with anhydrous ammonia under pressure for about 16 hours at 25° C. to yield the corresponding polymer containing basic amine groups. The latter polymer was dispersible in water but was coagulated upon the addition of salts such as sodium chloride.

EXAMPLE VI

*Glycidyl methacrylate/vinyl acetate copolymer+ethanolamine*

A solution of 71 parts of glycidyl methacrylate, 215 parts vinyl acetate, 667 parts anhydrous dioxane and 5.7 parts benzoyl peroxide was heated at about 80° C. for three hours. During this period, polymerization gradually took place, and the monomers were essentially completely polymerized. The resulting solution was clear, without color and had a viscosity of 0.22 poises. This solution contained about 28.6% of oxirane copolymer. The epoxide copolymer had an equivalent weight of 610 per oxirane oxygen. Upon the addition of water, the copolymer was precipitated.

Five parts of the above solution was diluted with 8 parts of dioxane and to this was added 1 part of ethanolamine. This solution was heated at 95° C. for about 15 minutes. The resulting polymeric derivative precipitated upon the addition of water and was washed to remove residual traces of ethanolamine. The product was almost completely soluble upon treatment with dilute acetic acid, a portion of the product forming essentially a colloidal dispersion. Upon evaporation, this solution formed smooth, colorless, clear, rubbery films which developed good resistance to water after air-drying for several hours.

EXAMPLE VII

*Glycidyl methacrylate/styrene copolymer+ammonia or amines*

A solution of 50 parts glycidyl methacrylate, 75 parts styrene, 292 parts anhydrous dioxane and 3.75 parts benzoyl peroxide was placed in a closed container under nitrogen atmosphere and heated at 80° C. for a total of seven hours. During this period polymerization of the monomers was about 90% complete. The solution at this point had a viscosity of 0.15 poises. The clear solution of oxirane copolymer was then treated with ammonia and amines to obtain the corresponding amine copolymer, using the following procedure.

A portion of the above oxirane copolymer, in a closed autoclave, was pressurized with anhydrous ammonia and allowed to stand at 25° C. for about 16 hours. The resulting solution was clear, transparent and colorless. Upon addition of water, a soft polymer precipitated which was totally insoluble in water but was readily dissolved in 3% aqueous acetic acid. Such solutions upon evaporation on glass plates or wood surfaces deposited smooth, glossy, tough, hard films. These films after drying several hours had excellent resistance to water and exhibited water-repellent properties. The addition of formaldehyde to such solutions had a curing action on the films, thereby increasing the hardness and resistance to water. Heating such films accelerated drying and curing but did not greatly improve the properties of the films compared with films air-dried 24 hours or longer.

Similar acid-soluble polymeric amines were obtained by heating the above oxirane copolymer with ethanolamine, dimethylamine and monobutylamine. The oxirane copolymer had a unit equivalent weight of 450 per oxirane oxygen. The monobutylamine derivative had a neutral equivalent of 523.

EXAMPLE VIII

*Glycidyl methacrylate/butadiene copolymer+ammonia or amines*

A solution of 12 parts glycidyl methacrylate, 70 parts anhydrous dioxane and 0.9 part benzoyl peroxide was placed in a pressure bomb and 18 parts of butadiene was charged into the bomb. The charge was heated at 80° C. for 16 hours at the end of which time the bomb was cooled and the charge removed. There was obtained about 12 parts of copolymer by precipitation with addition of water. The copolymer was insoluble in dilute acetic acid, had an iodine number of about 190 and contained about 4% of oxirane oxygen.

The above oxirane copolymer, dissolved in dioxane, was treated with an excess of monobutylamine and the solution heated at 95° C. for about one hour. The polymeric derivative was precipitated by the addition of water. It dissolved in 3% acetic acid to give colorless, clear solutions. Evaporation of this solution on a glass plate yielded smooth, glossy, tough films.

Similar, acid-soluble derivatives of the above oxirane copolymer were obtained by treatment, as above, with ammonia, with dimethylamine and ethanolamine.

EXAMPLE IX

*Glycidyl methacrylate/butyl acrylate/styrene copolymer+amines or ammonia*

A solution of 40 parts of glycidyl methacrylate, 40 parts butyl acrylate, 20 parts styrene, 150 parts anhydrous methyl isobutyl ketone and 3 parts benzoyl peroxide was heated at 85° C. for 3 hours. There was obtained a solution containing 37% by weight of the oxirane copolymer which had a viscosity of 0.22 poise. The polymer was precipitated from solution by the addition of petroleum ether and was insoluble in dilute acetic acid.

About 10 parts of the above polymerization solution diluted with 30 parts dioxane was treated with about 8 parts of liquid ammonia and the solution allowed to stand at 25° C. for 16 hours. The resulting polymer derivative precipitated upon the addition of petroleum ether. After washing with water to remove residual ammonia, it dissolved in 3% aqueous acetic acid forming a clear, colorless solution. Upon evaporation the solution gave a clear, colorless, tough film.

Similar derivatives of the oxirane copolymer which were soluble in dilute aqueous acetic acid were obtained by treatment of the oxirane copolymer, in dioxane solution, with excess quantities of monoethanolamine, and dimethylamine.

EXAMPLE X

*Glycidyl methacrylate/butyl acrylate/butyl methacrylate copolymer+amines*

A solution of 40 parts glycidyl methacrylate, 40 parts butyl acrylate, 20 parts butyl methacrylate, 150 parts anhydrous methyl isobutyl ketone and 3 parts benzoyl peroxide was heated at 85° C. for about 2 hours. There was obtained a colorless, clear solution having a viscosity of 0.62 poise and 39.8% of oxirane copolymer. The oxirane copolymer was isolated by evaporation of the solution under reduced pressure. The copolymer was insoluble in water and dilute aqueous acetic acid.

A portion of the precipitated copolymer dissolved in dioxane was warmed with excess dimethylamine in a closed vessel at 80° C. for about one hour. The reaction product was precipitated by water but readily dissolved in dilute aqueous acetic acid. Upon the addition of excess alkali or ammonium hydroxide to the acid solution, the product again precipitated. Films obtained from solutions in dilute acetic acid were clear, colorless, moderately hard, and tough. Upon air-drying for several hours or longer, they became insoluble and had excellent resistance to water.

Similar products, soluble in dilute aqueous acetic acid, were obtained by treating the epoxide copolymer, as above, with monoethylamine, monoethanolamine, diethanolamine, and ammonia.

EXAMPLE XI

*Allyl glycidyl ether/butyl acrylate/methyl methacrylate copolymer+amines*

To 200 parts allyl glycidyl ether containing one part benzoyl peroxide was added slowly with agitation over a period of three hours, at a temperature of 90–91° C., a solution of 125 parts methyl methacrylate, 25 parts butyl acrylate and 2.25 parts benzoyl peroxide. The heating was continued for another one-fourth of an hour. The polymerization solution had a viscosity of 4.35 poises and contained 49.3% copolymer solids.

A portion of the polymerization solution treated with low-boiling aliphatic hydrocarbon precipitated oxirane copolymer. Upon further washing with hydrocarbon solvent, and reprecipitation from a solution in acetone, there was obtained a copolymer sample essentially free from residual monomers. This contained 2.20% oxirane-oxygen, 60.56% carbon and 8.21% hydrogen.

A dioxane solution containing 14% by weight of the above oxirane polymer and 6.5% of monoethanolamine was heated at 90° C. for 2½ hours. The reaction product precipitated upon the addition of water and was washed with warm water. The product was soluble in dilute aqueous acetic acid and precipitated readily upon neutralization with alkali. The dry product obtained 1.11% nitrogen, 60.40% carbon and 8.74% hydrogen and had a neutral equivalent of 1260. Solutions of the above described polymeric amine on evaporation deposited films which were clear, smooth, hard, colorless, and moderately tough.

EXAMPLE XII

*Allyl glycidyl ether/vinyl acetate copolymer+amines or ammonia*

A solution comprising 3240 parts vinyl acetate, 360 parts allyl glycidyl ether, 1800 parts isopropyl alcohol and 72 parts di(tertiary butyl)peroxide was heated in a closed autoclave with agitation under an atmosphere of nitrogen, to a temperature of 100° C. The temperature was allowed to increase gradually over a period of about 3 hours to a final temperature of 130° C. and then held at this temperature for about one-fourth hour. Slight cooling was required during a portion of this cycle to control the exothermic polymerization and heating was necessary before appreciable polymerization occurred and, finally, to complete the polymerization. The conversion of monomer to polymer for a series of experiments varied from about 70 to 98% of theory.

The polyepoxide was isolated from the polymerization solution and purified by precipitation with petroleum ether. After washing and dissolution in methyl ethyl ketone it was further purified by again precipitating with petroleum ether. After dissolution in methyl ether ketone the petroleum ether was removed by warming the solution under reduced pressure. The product had a molecular weight of about 3200 and contained about 1.15% oxirane corresponding to an oxirane equivalent weight of 1355 and an allyl glycidyl ether content of 8.4%. The polyepoxide was soluble in acetone, methyl ethyl ketone, benzene, and in alcohol/water mixtures. It had low solubility in anhydrous alcohols and was practically insoluble in aliphatic hydrocarbons.

The purified polyepoxide at 71% concentration in methyl ethyl ketone was used to make up an amination solution comprising 690 parts polyepoxide, 280 parts methyl ethyl ketone, 1194 parts isopropyl alcohol, 46 parts water and 90 parts isopropylamine. This solution was heated, under an atmosphere of nitrogen, for three hours at 55° C. A portion of the solution, after the heating cycle, was precipitated with petroleum ether, washed with the same solvent, and then further purified by dissolution in dioxane followed by precipitation and washing with petroleum ether. This purification cycle was repeated. The product was again dissolved in dioxane and the residual petroleum ether removed under reduced pressure. The product had a neutral equivalent of 2000 and an oxirane equivalent of 5160. A similar amination of the same polyepoxide heated for 2.5 hours at 55° C. yielded a polyamine having a neutral equivalent of 2520 and an oxirane equivalent of 2920, and which was soluble in dilute aqueous acids, such as acetic and carbonic acids.

Upon the addition of low amounts of formaldehyde (⅓ to ⅕ mole formaldehyde HCHO per amine equivalent) the viscosity of the aqueous solution of the polyamine carbonate was greatly reduced. Likewise, when solutions of the polyamine carbonate were exposed to air for several hours or longer or briefly exposed to reduced pressure of 10–40 mm., carbon dioxide was released and the solution viscosity decreased rapidly. A comparison of these effects is given in the tabulation below.

| Polyamine | | Carbonate— Viscosity at solids content | | Carbonate + 0.25 mole formaldehyde (based on neut. equiv. at solids content | | After loss of $CO_2$ at solids content | |
|---|---|---|---|---|---|---|---|
| Neut. equiv. | Oxirane equiv. | 35% | 30% | 39.2% | 41.2% | 30.8% | 36.7% |
| 2,000 | 5,160 | 75 | 3.3 | 5.5 | ------ | 0.2 | ------ |
| 2,520 | 2,920 | 46 | 1.0 | ------ | 13 | ------ | 0.4 |

Polyamines of this type on evaporation from aqueous solutions form clear, tough, glossy films which are insoluble in water immediately after air-drying and show good resistance to water (no swelling, only slight softening upon 1 hour exposure) after air-drying overnight or longer. Pigments such as titanium oxide, calcium carbonate, barium sulfate, lithopone and many others, can be milled into the viscous solutions of these polyamines, followed by the addition of formaldehyde to reduce the viscosity to brushing or spraying consistency. Other agents which promote colloid formation can likewise be added to obtain reduced viscosity and other desired effects. Such paint compositions at desired viscosity levels brush easily and dry rapidly to coatings having high gloss and excellent resistance to wet scrubbing. In alternative water-paint preparations the formaldehyde can be added prior to the pigment followed by ball milling or grinding to give desired dispersions of the pigments in the composition.

EXAMPLE XIII

*Allyl glycidyl ether/vinyl acetate copolymer+isopropylamine*

An allyl glycidyl ether/vinyl acetate polyepoxide prepared as in Example XII had a molecular weight of about 4800 and an oxirane equivalent of 1400. A solution comprising 30% of this polyepoxide, 12% methyl ethyl ketone, 52.5% isopropyl alcohol, 2.0% water and 3.8% isopropylamine was held at 50° C. for 2 hours. The polyamine, isolated and purified by petroleum ether precipitations and washings had a neutral equivalent of 2720 and an oxirane equivalent of 3300. This product, as the acetate or carbonate, was soluble in aqueous solutions.

Films obtained from aqueous solutions of the polyamine carbonate dried rapidly to tough, tack-free, water-resistant coatings. Aqueous solutions of the acetate of this polyamine at about 33% solids had much higher viscosity (about 60 poises) than the corresponding more colloidal polyamine carbonate (0.75 poises) or the corresponding 1:1 acetate/carbonate (3.9 poises) solutions, at the same concentration levels. Upon heating, upon exposure to air, or when placed under reduced pressure, solutions of polyamine carbonate released carbon dioxide and showed increasing colloid formation under light-scattering measurements, and a gradual lowering in viscosity. Upon exposure to carbon dioxide at atmospheric or slightly elevated pressure, these effects were reversed.

EXAMPLE XIV

*Allyl glycidyl ether/vinyl acetate copolymer+isopropylamine*

A solution comprising 2280 parts vinyl acetate, 120 parts allyl glycidyl ether, 480 parts isopropyl alcohol and 12 parts benzoyl peroxide was heated to 70° C. and held at 70–74° C. (reflux temperature) over a period of two hours. An additional 5 parts of benzoyl peroxide catalyst was added and the solution held at reflux temperature (73–74° C.) for an additional period of about three hours. Another 5 parts of benzoyl peroxide was then added and mild heating continued to maintain reflux for an additional two and a half hours. At the end of this time the solution was moderately viscous. The solution temperature, under mild reflux, was 81° C. A solids determination of the solution indicated that the conversion of monomers to polymer was 90.7% of theory. A sample of the polymer, purified by precipitation and washing with petroleum ether was found to contain 0.64% oxirane oxygen, corresponding to an oxirane equivalent weight of 2500. The molecular weight was about 7000.

The above polyepoxide was purified by precipitating and washing with petroleum ether followed by dissolving in methyl ethyl ketone and again precipitating and washing with petroleum ether. A 54.2% solution of this copolymer in methyl ethyl ketone was then used to prepare an amination solution comprising 30% polyepoxide, 26.6% methyl ethyl ketone, 38.4% isopropyl alcohol, 2.0% water and 4.0% isopropyl amine. This solution was heated at 55° C. for three hours and then allowed to stand at 0° C. for about 60 hours. A portion of the solution purified by precipitating and washing with petroleum ether was found by analysis to have a neutral equilavent of 4070 and an oxirane equivalent of 5600. Separation of the polyamine by precipitating with water and washing, followed by dissolving in ethanol and reprecipitating and washing with water, gave a product which upon mixing with water in an atmosphere of carbon dioxide under about 2 lbs. pressure, formed a cloudy solution of moderately low viscosity at 35.6% solids. The neutral equivalent value of this product was 4040. Addition of one-half mole equivalent of acetic acid, based on neutral equivalent, to the polyamine carbonate gave a nearly clear, highly viscous solution. Replacing the carbonate with acetate by addition of one mole of acetic acid based on neutral equivalent gave a nearly colorless, clear, viscous, non-flowable paste at 35.6% polyamine solids.

An enamel prepared by milling titanium oxide pigment into a 21.4% aqueous solution of the above polyamine acetate, using 1/1 pigment/polyamine ratio by weight, had excellent brushing properties, and showed fairly good leveling. Such coatings after air-drying for several hours could be washed with water or dilute soap solutions without deleterious effects. These coatings had good gloss and superior whiteness with no noticeable discoloration after heating at 70° C. for 24 hours. A corresponding enamel made from the polyamine acetate/carbonate (0.5/0.5 mole equivalent ratio based on neutral equivalent) had appreciably lower viscosity at about 48% total solids and good application properties. Air-dried coating of this enamel had slightly better resistance to wet scrubbing than those made from the enamel based on the complete acetate of the same polyamine.

The above polyepoxide aminated in a solution comprising 30% polyepoxide, 65.2% isopropyl alcohol, 1.25% water and 3.6% isopropylamine (heated three hours at 55° C. and after standing 60 hours at 25° C.) yielded a product having a neutral equivalent of 2600. This product, upon mixing with a small amount of water and ⅓ mole equivalent of acetic acid followed by mixing under an atmosphere of carbon dioxide (1–2 lbs. pressure), yielded a viscous clear paste having 46.8% polyamine solids. Dilution with water to about 30% solids yielded a clear solution of pH 7.2, having a viscosity of 27 poises. The addition of ⅓ mole formaldehyde to this solution gave a soft paste-like composition. Films of these products were insoluble in water although they were softened appreciably upon prolonged contact with water.

A similar polyamine, having a neutral equivalent value of 5050, prepared by the same procedures from a polyepoxide copolymer of allyl glycidyl ether and vinyl acetate having an oxirane equivalent of 2580 and a molecular weight of about 7000, was dispersible, largely in colloid state, in aqueous solution as the carbonate. A 30% solution of this polyamine had a pH value of 7.4 and a viscosity of 2.0 poises. Air-dried films of this product were clear, hard and tough and rapidly developed high resistance to water, including severe washing treatments with soapy water.

Since the composition of the precursor oxirane copolymer can be varied widely by the choice of suitable monomers and the conditions used for copolymerization, it is possible to control closely the character of the polyamine which is prepared by the above process. It is obviously important that the polymerization be carried out under conditions of monomer ratios, temperature, and catalyst concentrations, known in the art of polymerization and illustrated by the examples, so that a suitable and uniform distribution of oxirane units is obtained in the parent oxirane copolymer. In order to obtain polyamines of favorable solubility in dilute aqueous acids, the resulting oxirane polymer should be reacted with a controlled amount of ammonia, or primary and secondary amines to avoid crosslinking of the polymer and favor the desired conversion of the oxirane units to the beta-hydroxy amine structures.

Furthermore, to obtain uniform solubility of the polyamine copolymers of this invention, the distribution of oxirane groups in the precursor copolymer must be fairly uniform. This can be accomplished by suitable control of the polymerization conditions so that both the vinyl monomer and the monomer containing oxirane groups are uniformly copolymerized at the desired rate. It is well known in the art of copolymerizations that such control is obtained by suitable adjustments of the polymerization factors such as the solvent used, the type of catalyst and its concentration, the ratio of the monomers employed and the temperature at which the polymerization is accomplished. Representative conditions for preparing suitable oxirane copolymers are given in the foregoing examples. Further adjustments of the conditions illustrated and other factors can be made to obtain specific effects, such as variations in molecular weight, oxirane content, yield of polymer and desired film-forming properties. It is essential, however, that one of the monomers of the copolymerization contain the oxirane grouping to furnish this structure in the copolymer which is prepared and that the conditions be such that the oxirane group is retained in the copolymer until reacted with the amine group.

The reaction of ammonia or the selected hydrogen-bearing monoamine with the epoxide-containing copolymer may take place at room or lower temperatures, although higher temperatures are generally preferable. To obtain the desired reaction without extensive crosslinking, it is usually advantageous to employ an appreciable excess of the monoamine, e. g., a 2 to 10 fold excess based on the equivalent value of the oxirane unit of the copolymer. This is particularly true with amines, such as propylamines, which form more basic aqueous solutions than with less basic amines, such as cyclohexylamine. The reaction may be carried out with or without the presence of inert solvents. It is often advantageous to dissolve the epoxide copolymer in the monoamine, such as monobutyl amine, and complete the reaction by heating. Representative conditions for this reaction are illustrated by the examples and for specific copolymers, are easily determined by procedures well known in the art. In some cases, desired effects in the properties of the polyamines are obtainable by employing combinations of various monoamines or such monoamines used, simultaneously or successively, in combination with ammonia. In general, isopropylamine is preferred in view of its high reactivity and low tendency to undergo crosslinking reactions with other oxirane-containing molecules. The polyamine copolymers of this invention are soluble in dilute acetic acid or aqueous solutions of other monobasic organic and inorganic acids. In general, dibasic or polybasic acids tend to favor colloid formation and in some instances insolubilize the polyamine. Films obtained by evaporation of solutions of these polymeric amines in dilute acids are usually clear, hard, and tough. However, variations in film character can be obtained, as described above, by suitable selection of the comonomers, control of the conditions for polymerization, and selection of the monoamine for reaction with the oxirane copolymer.

The polyamines of this invention also react to form salts with various acids such as oleic acid, drying oil acids, castor oil acids, benzoic acid, adipic acid, etc.

In general, aldehydes, such as formaldehyde, react with aqueous acidic or slightly basic solutions of the polyamine copolymers of this invention to give colloids which have modified rheological properties. Lower viscosity of the solutions is likewise obtained by the use of salts, heat, and less soluble organic acids. For example, a solution having 30–35% solids and a viscosity of 30 to 60 poises upon loss of carbon dioxide (carbonate salt) had a viscosity which decreased to 0.5 to 2.0 poises with formation of colloid particles of 0.1 to 0.4 micron in size. This property is of advantage in the preparation and use of aqueous pigmented compositions for coatings applied by brushing, spraying or flowing. Upon air drying such coatings rapidly develop high resistance to water, as in wet scrubbing.

The polyamine copolymers of this invention are useful as coatings and impregnating compositions for paper, wood and textiles. They are also useful as adhesives, as dispersing agents for waxes and oils, and as binders for printing inks and paints. These polyamine copolymers are substantially colorless and have outstanding stability of color in contrast to polyamines obtained by other procedures, such as by hydrogenation reactions.

As many apparently widely different embodiments of this invention may be made without departing from the spirit and scope thereof, it is to be understood that this invention is not limited to the specific embodiments thereof except as defined in the appended claims.

I claim:

1. A polyamine copolymer wholly soluble in aqueous 5% acetic acid having an amino nitrogen content of 0.3 to 10% and which is the reaction product of a member of the class consisting of ammonia and amino-hydrogen-bearing monoamines with an epoxide copolymer consisting essentially of a polymerized monoethylenically unsaturated epoxy monomer and at least one polymerized vinylidene epoxy-free monomer selected from the class consisting of epoxy-free ethylenically unsaturated hydrocarbon compounds having a terminal ethylenic double bond, epoxy-free vinyl monomers containing oxygen, chloroprene, vinyl chloride, and vinylidene chloride, in a mole ratio of 1:1 to 1:75, said epoxide copolymer having a molecular weight of at least 800 and an epoxide oxygen content of 0.4 to 7%.

2. A polyamine copolymer wholly soluble in aqueous 5% acetic acid having an amino nitrogen content of 0.3 to 10% and which is the reaction product of a member of the class consisting of ammonia and amino-hydrogen-bearing monoamines with an epoxide copolymer consisting essentially of a polymerized monoethylenically unsaturated epoxy monomer and at least one polymerized epoxy-free vinyl monomer containing oxygen, in a mole ratio of 1:1 to 1:75, said epoxide copolymer having a molecular weight of at least 800 with an epoxide oxygen content of 0.4 to 7%.

3. A polyamine copolymer wholly soluble in aqueous 5% acetic acid having an amino nitrogen content of 0.3 to 10% and which is the reaction product of a member of the class consisting of ammonia and amino-hydrogen-bearing monoamines with an epoxide copolymer consisting essentially of a polymerized monoethylenically unsaturated epoxy monomer and polymerized vinyl acetate, in a mole ratio of 1:1 to 1:75, said epoxide copolymer having a molecular weight of at least 800 with an epoxide oxygen content of 0.4 to 7%.

4. A polyamine copolymer wholly soluble in aqueous 5% acetic acid as set forth in claim 1 wherein said monoethylenically unsaturated epoxy monomer is allyl glycidyl ether.

5. A polyamine copolymer wholly soluble in aqueous 5% acetic acid having an amino nitrogen content of 0.4 to 7% and which is the reaction product of a member of the class consisting of ammonia and amino-hydrogen-bearing monoamines with an epoxide copolymer consisting essentially of a polymerized monoethylenically unsaturated epoxy monomer and at least one polymerized epoxy-free vinyl monomer containing an ester group, in a mole ratio of 1:1 to 1:45, said epoxide copolymer having a molecular weight of at least 1000 with an epoxide oxygen content of 0.4 to 7%.

6. A polyamine copolymer wholly soluble in aqueous 5% acetic acid having an amino nitrogen content of 0.4 to 7% and which is the reaction product of an alkyl amino-hydrogen-bearing monoamine with an epoxide copolymer consisting essentially of a polymerized monoethylenically unsaturated epoxy monomer and at least one polymerized vinyl alkanoate epoxy-free monomer, in a mole ratio of 1:1 to 1:45, said epoxide copolymer having a molecular weight of at least 1000 with an epoxide oxygen content of 0.4 to 7%.

7. A polyamine copolymer wholly soluble in aqueous 5% acetic acid having an amino nitrogen content of 0.4 to 7% and which is the reaction product of a member of the class consisting of ammonia and amino-hydrogen-bearing monoamines with an epoxide copolymer consisting essentially of polymerized allyl glycidyl ether and polymerized vinyl acetate, in a mole ratio of 1:1 to 1:45, said epoxide copolymer having a molecular weight of at least 1000 with an epoxide oxygen content of 0.4 to 7%.

8. A polyamine copolymer wholly soluble in aqueous 5% acetic acid having an amino nitrogen content of 0.4 to 7% and which is the reaction product of an alkyl amino-hydrogen-bearing monoamine with an epoxide copolymer consisting essentially of polymerized allyl glycidyl ether and polymerized vinyl acetate, in a mole ratio of 1:1 to 1:45, said epoxide copolymer having a molecular weight of at least 1000 with an epoxide oxygen content of 0.4 to 7%.

9. A polyamine copolymer wholly soluble in aqueous 5% acetic acid having an amino nitrogen content of 0.4 to 7% and which is the reaction product of isopropylamine with an epoxide copolymer consisting essentially of polymerized allyl glycidyl ether and polymerized vinyl acetate, in a mole ratio of 1:1 to 1:45, said epoxide copolymer having a molecular weight of at least 1000 with an epoxide oxygen content of 0.4 to 7%.

10. A polyamine copolymer wholly soluble in aqueous 5% acetic acid having an amino nitrogen content of 0.3 to 10% and which is a partially aminated epoxide copolymer consisting essentially of a polymerized monoethylenically unsaturtaed epoxy monomer and at least one polymerized vinylidene epoxy-free monomer selected from the class consisting of epoxy-free ethylenically unsaturated hydrocarbon compounds having a terminal ethylenic double bond, epoxy-free vinyl monomers containing oxygen, chloroprene, vinyl chloride, and vinylidene chloride, in a mole ratio of 1:1 to 1:75, said epoxide copolymer having a molecular weight of at least 800 with an epoxide oxygen content of 0.4 to 7%, and said partially aminated epoxide copolymer having from 10 to 98% of the epoxide groups reacted with a member of the class consisting of ammonia and amino-hydrogen-bearing monoamines.

11. A polyamine copolymer wholly soluble in aqueous 5% acetic acid having an amino nitrogen content of 0.3 to 10% and which is a partially aminated epoxide copolymer consisting essentially of a polymerized monoethylenically unsaturated epoxy monomer and at least one polymerized epoxy-free vinyl monomer containing oxygen, in a mole ratio of 1:1 to 1:75, said epoxide copolymer having a molecular weight of at least 800 with an epoxide oxygen content of 0.4 to 7%, and said partially aminated epoxide copolymer having from 10 to 98% of the epoxide groups reacted with a member of the class consisting of ammonia and amino-hydrogen-bearing monoamines.

12. A polyamine copolymer wholly soluble in aqueous 5% acetic acid having an amino nitrogen content of 0.3 to 10% and which is a partially aminated epoxide copolymer consisting essentially of a polymerized monoethylenically unsaturated epoxy monomer and polymerized vinyl acetate, in a mole ratio of 1:1 to 1:75, said epoxide copolymer having a molecular weight of at least 800 with an epoxide oxygen content of 0.4 to 7%, and said partially aminated epoxide copolymer having from 10 to 98% of the epoxide groups reacted with a member of the class consisting of ammonia and amino-hydrogen-bearing monoamines.

13. A polyamine copolymer wholly soluble in aqueous 5% acetic acid as set forth in claim 10 wherein said monoethylenically unsaturated epoxy monomer is allyl glycidyl ether.

14. A polyamine copolymer wholly soluble in aqueous 5% acetic acid having an amino nitrogen content of 0.4 to 7% and which is a partially aminated epoxide copolymer consisting essentially of a polymerized monoethylenically unsaturated epoxy monomer and at least one polymerized epoxy-free vinyl monomer containing an ester group, in a mole ratio of 1:1 to 1:45, said epoxide copolymer having a molecular weight of at least 1000 with an epoxide oxygen content of 0.4 to 7%, and said partially aminated epoxide copolymer having from 50 to 80% of the epoxide groups reacted with a member of the class consisting of ammonia and amino-hydrogen-bearing monoamines.

15. A polyamine copolymer wholly soluble in aqueous 5% acetic acid having an amino nitrogen content of 0.4 to 7% and which is a partially aminated epoxide copolymer consisting essentially of a polymerized monoethylenically unsaturated epoxy monomer and at least one polymerized vinyl alkanoate epoxy-free monomer, in a mole ratio of 1:1 to 1:45, said epoxide copolymer having a molecular weight of at least 1000 with an epoxide oxygen content of 0.4 to 7%, and said partially aminated epoxide copolymer having from 50 to 80% of the epoxide groups reacted with a member of the class consisting of ammonia and amino-hydrogen-bearing monoamines.

16. A polyamine copolymer wholly soluble in aqueous 5% acetic acid having an amino nitrogen content of 0.4 to 7% and which is a partially aminated epoxide copolymer consisting essentially of polymerized allyl glycidyl ether and polymerized vinyl acetate, in a mole ratio of 1:1 to 1:45, said epoxide copolymer having a molecular weight of at least 1000 with an epoxide oxygen content of 0.4 to 7%, and said partially aminated epoxide copolymer having from 50 to 80% of the epoxide groups reacted with a member of the class consisting of ammonia and amino-hydrogen-bearing monoamines.

17. A polyamine copolymer wholly soluble in aqueous 5% acetic acid having an amino nitrogen content of 0.4 to 7% and which is a partially aminated epoxide copolymer consisting essentially of polymerized allyl glycidyl ether and polymerized vinyl acetate, in a mole ratio of 1:1 to 1:45, said epoxide copolymer having a molecular weight of at least 1000 with an epoxide oxygen content of 0.4 to 7%, and said partially aminated epoxide copolymer having from 50 to 80% of the epoxide groups reacted with an alkyl amino-hydrogen-bearing monoamine.

18. A polyamine copolymer wholly soluble in aqueous 5% acetic acid having an amino nitrogen content of 0.4 to 7% and which is a partially aminated epoxide copolymer consisting essentially of polymerized allyl glycidyl ether and polymerized vinyl acetate, in a mole ratio of 1:1 to 1:45, said epoxide copolymer having a molecular weight of at least 1000 with an epoxide oxygen content of 0.4 to 7%, and said partially aminated epoxide copolymer having from 50 to 80% of the epoxide groups reacted with isopropylamine.

19. A polyamine copolymer wholly soluble in aqueous 5% acetic acid having an amino nitrogen content of 0.3 to 10% and which is the reaction product of an alkanol amino-hydrogen-bearing monoamine with an epoxide copolymer consisting essentially of a polymerized monoethylenically unsaturated epoxy monomer and at least one polymerized vinylidene epoxy-free monomer selected from the class consisting of epoxy-free ethylenically unsaturated hydrocarbon compounds having a terminal ethylenic double bond, epoxy-free vinyl monomers containing oxygen, chloroprene, vinyl chloride, and vinylidene chloride, in a mole ratio of 1:1 to 1:75, said epoxide copolymer having a molecular weight of at least 800 and an epoxide oxygen content of 0.4 to 7%.

References Cited in the file of this patent
UNITED STATES PATENTS

| | | |
|---|---|---|
| 2,575,558 | Newey et al. | Nov. 20, 1951 |
| 2,606,810 | Erickson et al. | Aug. 12, 1952 |
| 2,650,151 | Ham | Aug. 25, 1953 |